United States Patent [19]

Mozdzer

[11] 3,958,131

[45] May 18, 1976

[54] SOLID STATE POWER CONTROL APPARATUS

[75] Inventor: Alexander Mozdzer, Valley Stream, N.Y.

[73] Assignee: Staley Elevator Company, Inc., Long Island City, N.Y.

[22] Filed: May 29, 1974

[21] Appl. No.: 474,191

[52] U.S. Cl. .................... 307/106; 318/599; 328/28

[51] Int. Cl.$^2$ .................... G05B 11/28; H02K 3/00; H04B 13/00

[58] Field of Search .................... 318/345, 599, 341; 307/240, 242, 261, 265, 269, 283, 106; 328/28; 331/111, 172, 173; 323/24

[56] References Cited

UNITED STATES PATENTS

| | | | |
|---|---|---|---|
| 3,315,098 | 4/1967 | Eckl | 307/301 |
| 3,438,023 | 4/1969 | Apitz | 323/24 |
| 3,509,441 | 4/1970 | Welsh | 323/24 |
| 3,617,840 | 11/1971 | Salihi | 318/341 |
| 3,671,849 | 6/1972 | Kingston | 323/24 |
| 3,684,919 | 8/1972 | Cramer | 323/24 |
| 3,705,313 | 12/1972 | Ohsawa | 307/240 |
| 3,743,911 | 7/1973 | Erler | 307/265 |

*Primary Examiner*—Robert K. Schaefer
*Assistant Examiner*—John J. Feldhaus
*Attorney, Agent, or Firm*—Hopgood, Calimafde, Kalil, Blaustein & Lieberman

[57] ABSTRACT

A solid state power controller adapted for use with a single or multiple phase A.C. power source employs, for each phase, oppositely poled directional transistor switches connected in parallel with a load, and parallel oppositely poled directional transistor switches serially connecting the load and a line source phase.

Control circuitry is provided for rendering the serial transistor switches selectively operative in a chopping, pulse modulated mode which is variable to effect power control. The load shunting directional switches are alternately enabled responsive to the instantaneous line voltage polarity for transient suppression.

9 Claims, 13 Drawing Figures

LINE VOLTAGE

OUTPUT OF LEAD NETWORK 30

OUTPUT OF ZERO. CROSS. DET. 32

THRESHOLD
OUTPUT OF RELAXATION OSCILLATOR 34

OUTPUT OF TRIGGER CIRCUIT 40

OUTPUT OF CIRCUIT 45

OUTPUT OF GATE 48

OUTPUT OF GATE 49

SOLID STATE POWER CONTROL APPARATUS

This invention relates to electronic power controllers and, more specifically, to a solid state circuit arrangement for regulating power applied to a load (which may be inductive) from a single or plural phase A.C. potential source.

It is an object of the present invention to provide an improved A.C. power controlling circuit arrangement.

More specifically, it is an object of the invention to provide a pulse modulated switched power controller arrangement which is substantially free of deleterious switching transients; which may drive a load from a single or plural phase potential source; and which may be employed to energize varying loads, including motor and other inductive impedances.

The above and other objects, features and advantages of the present invention are realized in a specific illustrative solid state adjustable power controlling arrangement employing oppositely poled, shunt connected transistor switches connected in parallel with each system load, and serially connected to each line phase utilized. Depending upon the instantaneous voltage polarity characterizing a particular line phase, one of the series switches is alternately opened and closed in a chopping mode at a rate dependent upon the power to be supplied to the load. An appropriate one of the directional switches in parallel with the load is continuously enabled to obviate transients which would otherwise be generated by reason of current flowing through any inductive reactance in the load during those intervals when the series switch opens rapidly.

In accordance with varying aspects of the present invention, a phase leading network, zero crossing detector, relaxation oscillator synchronized by the output of the zero crossing detector, and a variable threshold trigger circuit are cascaded, and employed with logic circuitry and a line polarity detector to generate the signals which operate the directional switches above described.

Figure 1A:
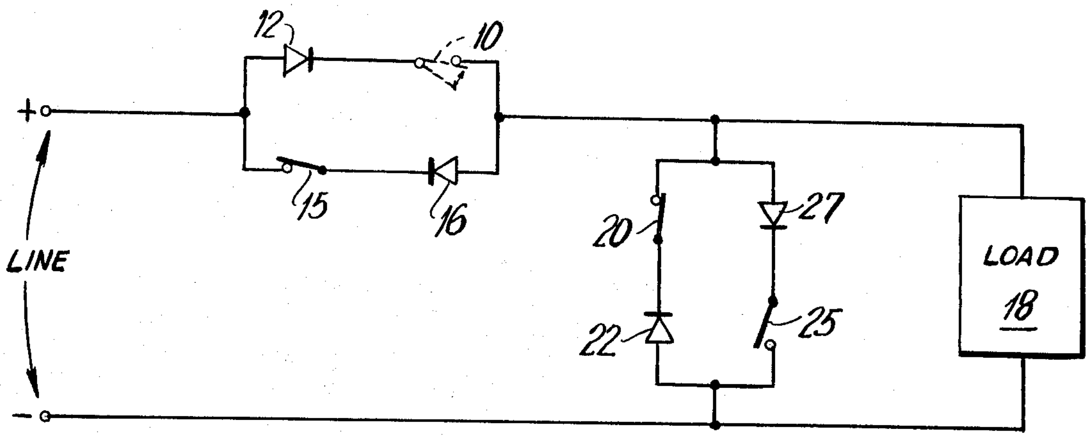
Figure 1B:
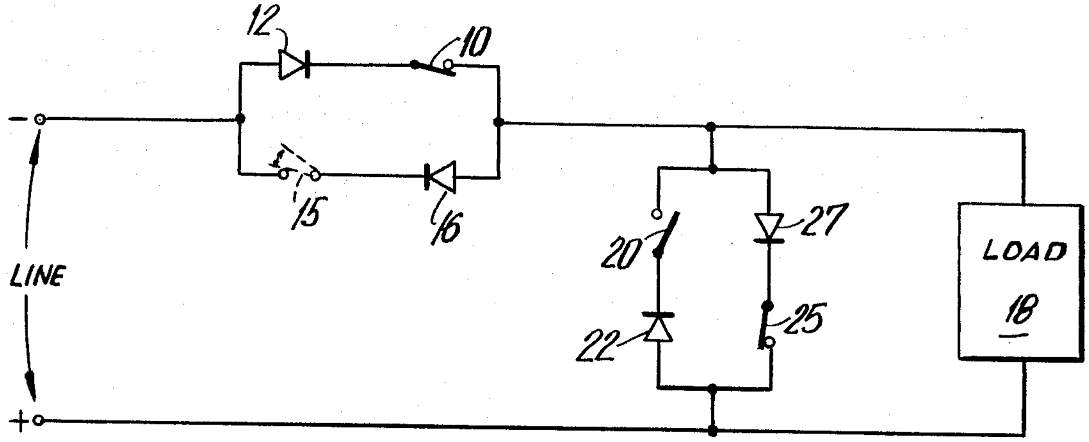
Figure 2:
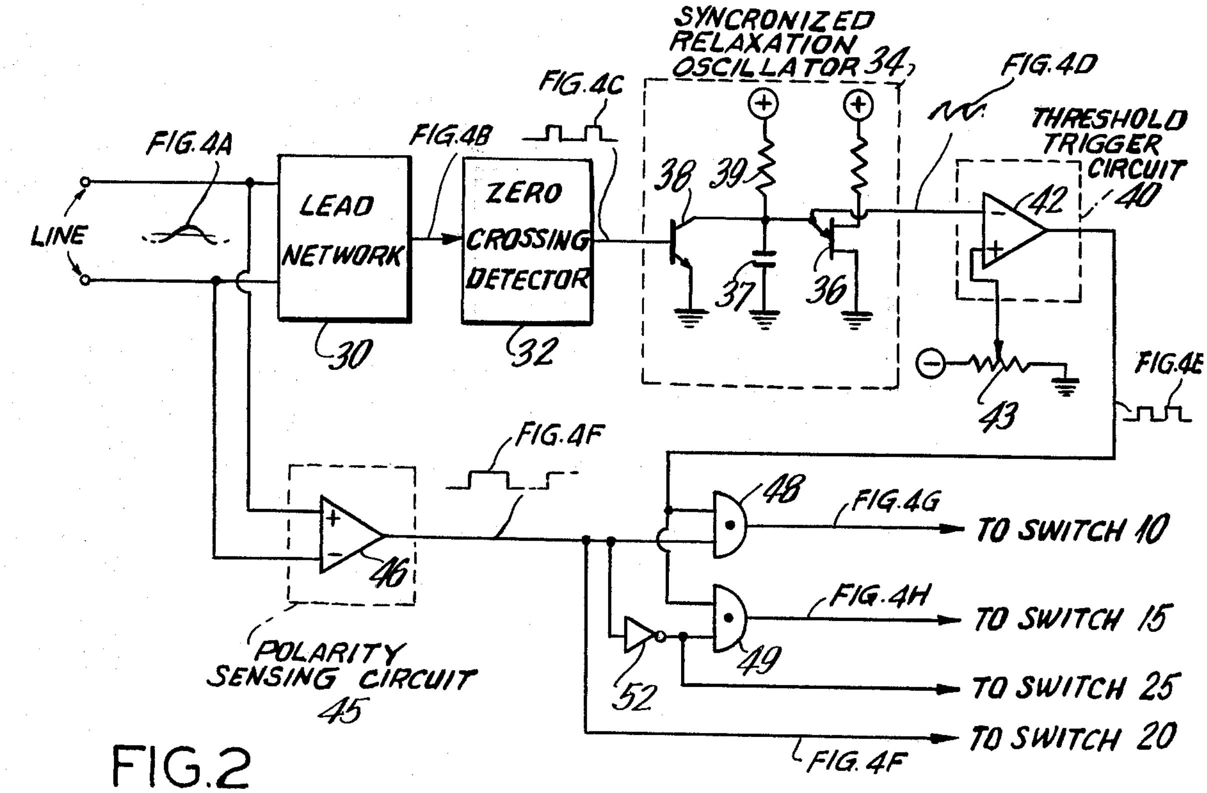
Figure 3:
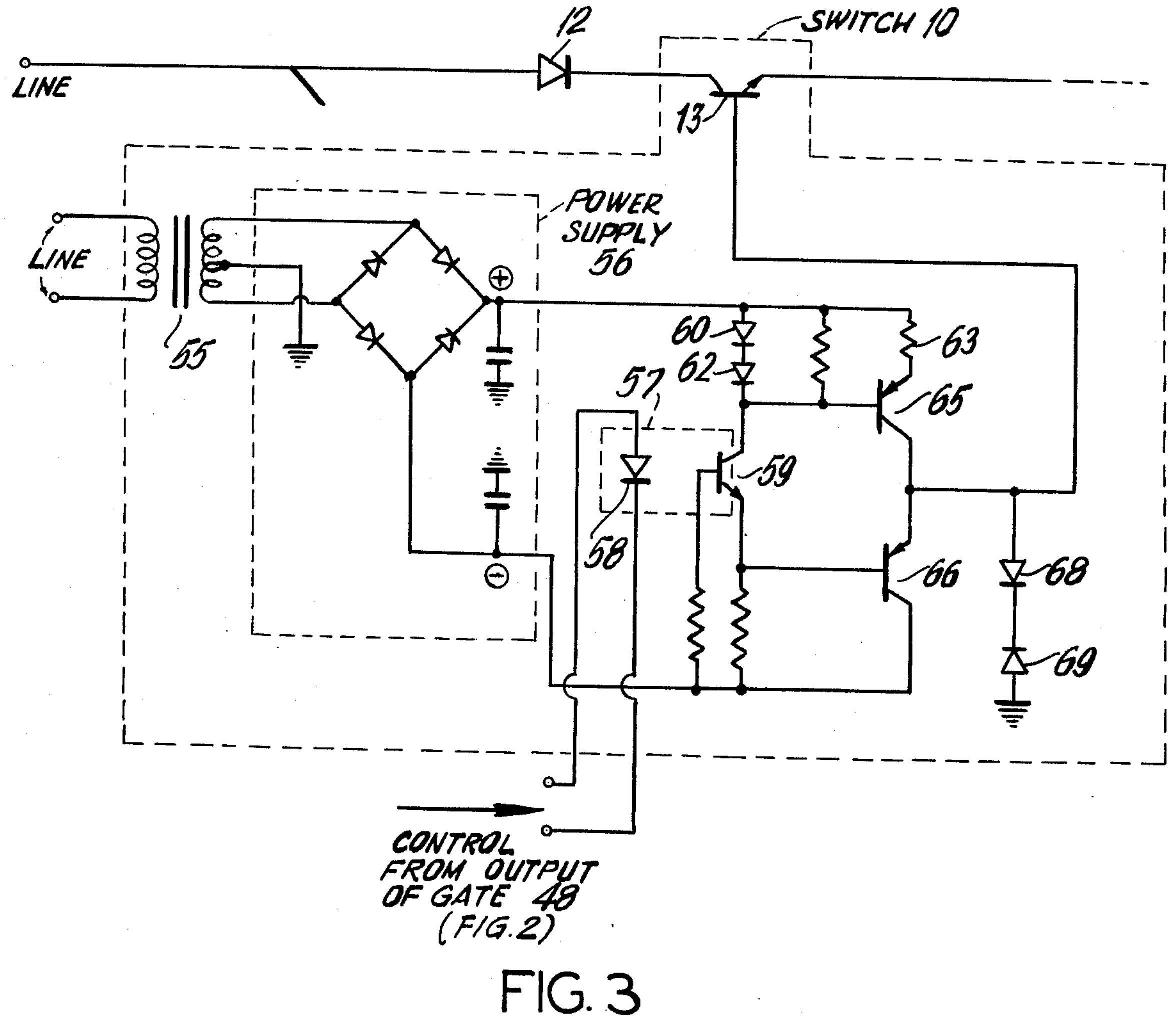
Figure 5:
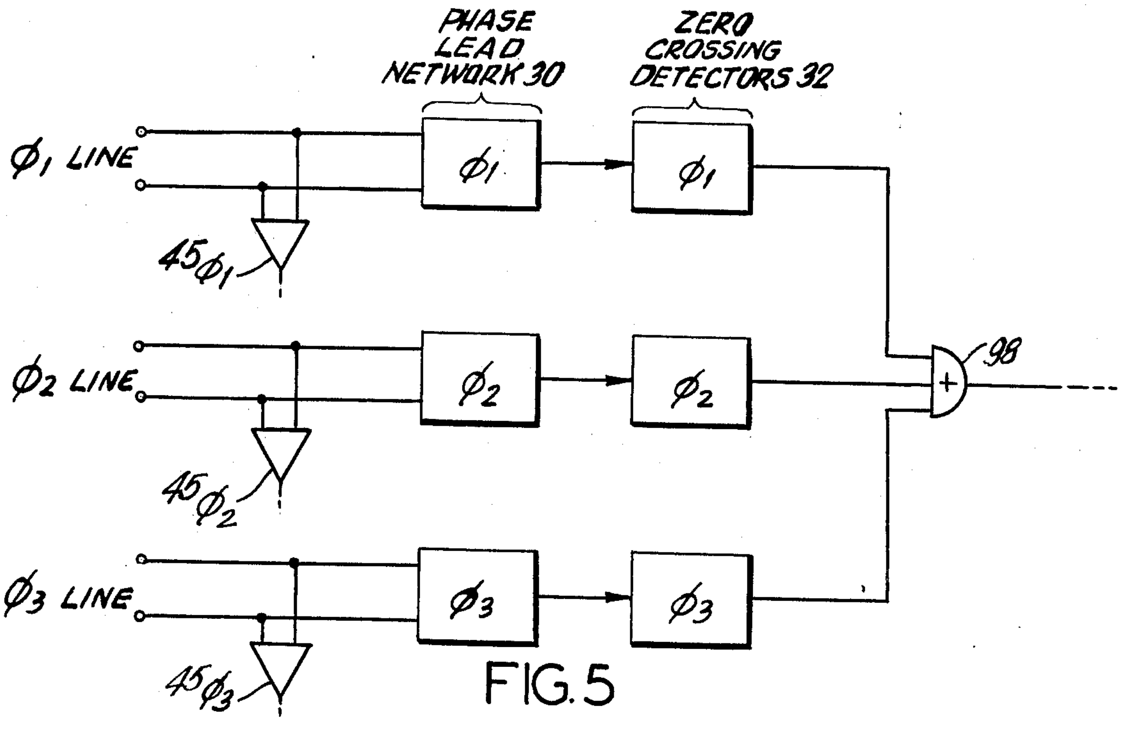

The features and operation of the present invention will become more clear from the following detailed description of a specific illustrative embodiment thereof, presented hereinbelow in conjunction with the accompanying drawing, in which:

FIGS. 1A and 1B schematically depict operation of a solid state power controlling circuit employing the principles of the present invention;

FIG. 2 illustrates circuitry for developing the control signals to selectively energize the switches 10, 15, 20 and 25 schematically shown in FIGS. 1A and 1B;

FIG. 3 is a schematic diagram depicting a switch 10, which is illustrative of the switches 10, 15, 20 and 25 shown in FIGS. 1A and 1B;

FIGS. 4A–4H comprise timing diagrams depicting the voltage waveforms characterizing selected circuit elements in FIG. 2; and FIG. 5 comprises a block diagram depicting the power controlling circuitry of the present invention adapted for use with plural phase potential sources.

Referring now to FIGS. 1A and 1B, there is depicted a power control circuit wherein a single voltage phase of an A.C. power line is applied to a load 18 via shunt connected paths respectively comprising a diode 12 and switch 10, and a diode 16 and switch 15. The switches 10 and 15 (and 20 and 25) are shown only schematically, illustrative circuitry for the switches being shown in detail in FIG. 3 and discussed below. One power phase is shown in FIGS. 1A and 1B, but it is to be appreciated that the circuitry of the present invention may be employed with any number of line phases. This will become more clear from the discussion below in conjunction with the structure of FIG. 5 which considers the case of a three phase power source.

FIGS. 1A and 1B schematically illustrate operation of the load control circuitry for the two polarity conditions for the A.C. line source indicated on the respective figures. Considering first the case of FIG. 1A where a positive potential is applied to the shunt connected switches as shown, the switch 10 is operated in a chopping mode, i.e., alternates between an open position which disconnects the line from the load 18, and the condition where the switch 10 is closed directly energizing the load from the line via the forward biased diode 12. Power control from the line to the load is effected on a pulse modulation basis dependent upon the switch closure intervals for the switch 10. That is, the amount of electrical energy delivered to the load 18 during the positive line voltage half cycle illustrated in FIG. 1A depends upon the relative time when the switch dwells in the closed position vis-a-vis the dwell time in the open position. Such modulation is per se well known to those skilled in the art, and may be effected by varying the switching rate with a fixed closure interval (pulse rate modulation); maintaining a constant rate and varying the closure duration (pulse width modulation) or the like.

Two shunt connected diode-transistor switches 27 and 25, and 22 and 20 are connected in parallel with the load 18. The purpose of the path 27–25 (or 22–20) is to obviate inductive transients which would otherwise be produced by any inductive reactance of the load 18 during the recurring intervals when the switch 10 (or, for the FIG. 1B polarity, the switch 15) opens. For the line polarity shown in FIG. 1A, the switch 20 is closed and the switch 25 is open. Accordingly, when the switch 10 opens any current flowing through a load 18 having an inductive reactance component will simply circulate through the diode 22 and closed switch 20 to avoid L di/dt voltage transients.

For the alternate line voltage half cycles illustrated by the polarity of FIG. 1B, the switch 20 is open and the switch 25 closed to again create a path for circulating currents in the load 18 which in this case would flow upward through the load 18 and downward through the diode 27 and the closed switch 25. The switch 20 is open to not short circuit the line.

The switch 10 is closed during the line half cycle shown in FIG. 1B such that when the line polarity reverses to that shown, any residual lagging current in the load 18 (downward in the orientation of FIG. 1B) can flow through the diode 12 and closed switch 10 until the current reverses to conform to the voltage polarity shown. Similarly, the switch 15 is closed for the half cycle shown in FIG. 1A. It is important that the switches 10 and 15 close for reasons above discussed no later than the voltage line transition and perhaps somewhat in advance of the line reversal. Accordingly, as below discussed, phase leading structure is employed in the control circuitry.

The circuitry of FIG. 2 which generates the control signals causing the switches 10, 15, 20 and 25 to automatically operate in the manner above described with respect to FIGS. 1A and 1B will now be considered. Moreover, the circuitry of FIG. 2 will be considered in conjunction with the voltage wave forms 4A–4H which characterize the potentials appearing at the various identified circuit points of FIG. 2. The line potential supplied by the power main (FIG. 4A) is first supplied to a phase lead network 30 which advances the phase of the FIG. 4A wave form (see FIG. 4B). Leading circuit networks, both active and passive, are well known to those skilled in the art.

Figures 4A, 4B, 4C, 4D, 4E, 4F, 4G, 4H:
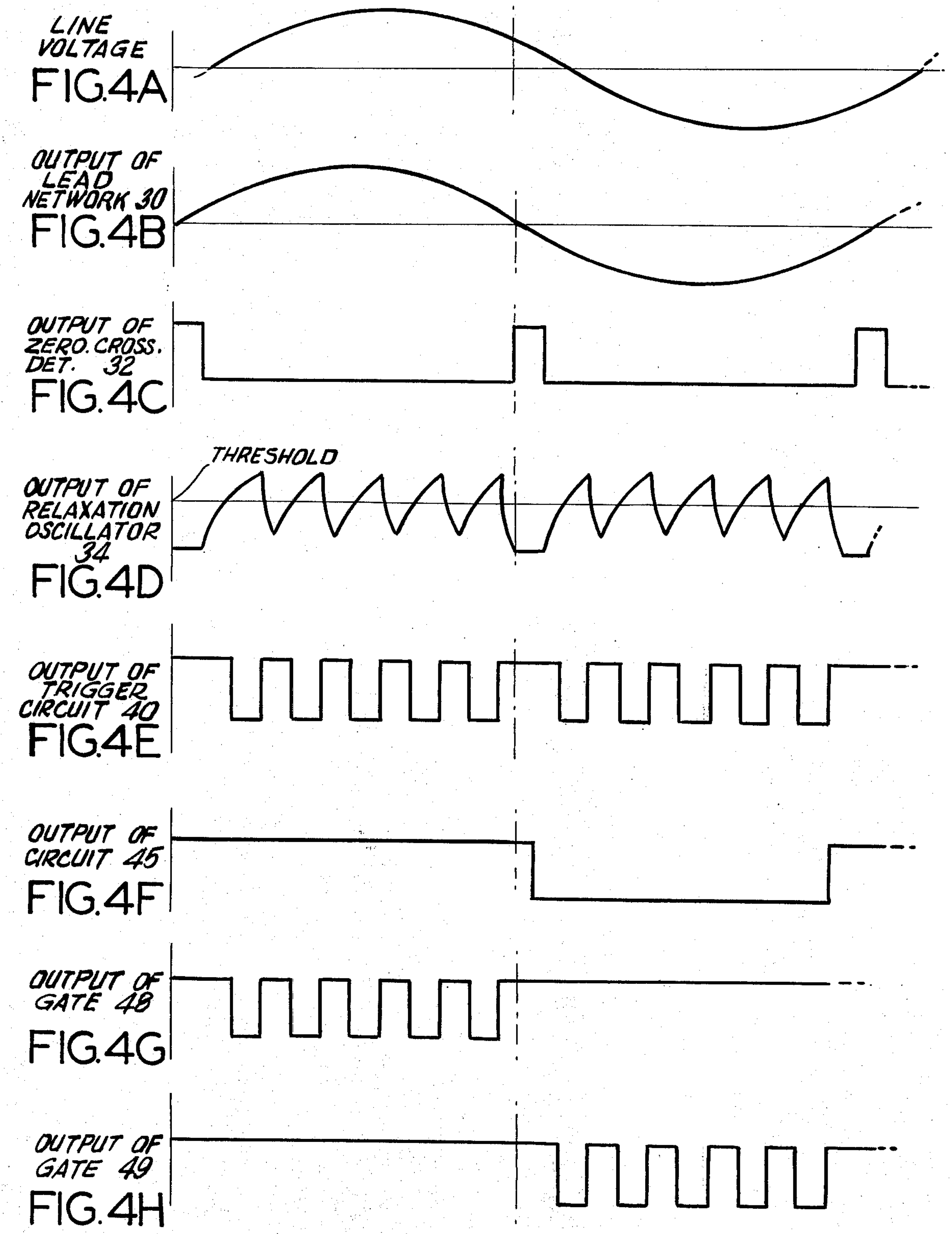

The output of the network 30 is supplied to a zero crossing detector 32 which provides an output pulse each time the phase advanced wave form of FIG. 4B passes through zero potential (FIG. 4C). Zero crossing detectors are well known to those skilled in the art and may comprise, for example, zero-reference comparators or operational amplifiers with reversed input connections and with OR'ed outputs, or integrated circuits made specifically for this purpose. The pulses (FIG. 4C) corresponding to the zero crossings of the phase-advanced signal (FIG. 4B) are used to synchronize a relaxation oscillator 34, e.g., of the uni-junction transistor type wherein a capacitor 37 charges through a resistor 39 and discharges through a uni-junction transistor 36 when the capacitor potential exceeds the threshold conduction voltage of the device 36. For synchronizing purposes, a transistor 38 periodically completely discharges the capacitor 37 during the zero crossing intervals. The output waveform of the relaxation oscillator 34 is shown in FIG. 4D and comprises intervals about the zero crossing periods when the waveform is at zero or ground potential, between which are a series of saw tooth shaped voltages which range between a maximum voltage corresponding to the inception of conduction by the uni-junction transistor 36, and a minimum, above ground potential corresponding to the level, below which 36 does not sustain conduction.

The waveform of FIG. 4D is supplied to a threshold trigger circuit 40, e.g., a simple comparator as shown, a Schmitt trigger, or the like. The reference or switching potential of the trigger circuit is controlled in any well known manner, e.g., by simply employing a potentiometer to vary one input potential in the case of a comparator. The comparator threshold potential is shown by the dashed line in FIG. 4D.

The line potential of FIG. 4A is also supplied to a polarity sensing and quantizing circuit 45 which again may most simply comprise a comparator 46. The output waveform of the circuit 45 is shown in FIG. 4F.

The waveform of FIG. 4E is supplied to two coincidence logic gates 48 and 49, e.g., AND gates as conceptually shown, NAND gates more commonly employed in integrated circuit logic systems, or the like. The output of the comparator 46 is supplied to one of the gates e.g., the gate 48 and in inverted form via an inverter 52 to the other gate 49. The line polarity-signaling output of the circuit 45 thus acts as a commutator to energize the switch 10 via the alternating output of the gate 48 (caused by the state switching of FIG. 4E at the output of circuit 40), or to supply a chopping control signal to the switch 15 via the output of the gate 49 when the sensing circuit 45 notes that the line has changed polarity.

The output of the circuit 45 directly controls the switch 20 during one voltage half cycle, and the inverted form thereof at the output of inverter 52 controls the state of switch 25 during the other line voltage half cycle periods. The voltage supplied to the switches 10, 15 and 20 are thus shown by the waveforms of FIGS. 4G, 4H and 4F, and that supplied to the switch 25 simply comprise an inversion of the waveform 4F.

Thus, FIG. 2 has been shown by the above to supply the chopping square wave-type signals to one or the other of the switches 10 or 15, maintaining the other one of these switches in a closed (conductive) state in conformity with the discussion above with respect to operation of the schematically illustrated circuitry (FIG. 1) of the present invention. Similarly, one of the switches 20 or 25 is operated during alternate voltage half cycles in the manner above considered.

Referring now to FIG. 3, there is depicted a particular structural implementation for the switch 10 shown in schematic form only in FIGS. 1A and 1B, the switch 10 being representative of the other switches 15, 20 and 25 shown in FIGS. 1A and 1B. The switch 10 in FIG. 3 comprises a transistor 13 serially connected with the diode 12. The diode 12 is employed to reduce the collector-emitter reverse direction potential which must be withstood by the transistor 13 when the line voltage reverses polarity.

The composite switch 10 includes a transformer 55 to isolate a switch subchassis from other circuit potentials, the primary of the transformer 55 being driven by any convenient line source or line phase which may or may not correspond to the A.C. line main which drives the diode 12 and transistor 13. The output of the secondary of the transformer 55 is supplied to a power supply 56 which generates d.c. potentials at the output thereof, the potentials being referenced to the local chassis ground.

The control potential for the switch 10 developed at the output of the gate 48 of FIG. 2 is applied across a voltage isolating optic coupling element 57 comprising a photo-diode 58 and a light responsive phototransistor 59. When the output of the gate 48 is low, the diode 58 is not energized. It therefore does not emit any light output, and the transistor 59 is off. When this condition obtains, the base of the transistor 13 is not forward biased, and the transistor 13 is nonconductive. This, of course, corresponds to the open state for the switch 10 schematically illustrated in FIG. 1A.

When the switch 10 is to close responsive to a relatively high output from the gate 48, the diode 58 is energized hence turning on the transistor 59. The now conducting transistor 59 reduces its collector potential (and thereby also that of the base of the transistor 65) hence rendering that PNP device conductive. particular, particulr, the base of the transistor 65 is reduced below the positive potential of the supply 56 by a voltage exceeding the two forward biased diode junctions of the diodes 60 and 62 (approximately 1.4 volts), hence turning the device 65 on to operate as a current source. The current of the current source is determined by the two diode drop voltages, less the base-emitter junction diode of the PNP device 65, divided by the resistance of an emitter resistance 63. This measured current then flows from the collector of the transistor 65 into the base of the transistor 13 thus turning it on. This corresponds to the closed state for the switch 10 in FIGS. 1A and 1B. Since the transistor 13 is effectively driven by a measured current source, it is not driven heavily into saturation, and may thus be turned off relatively rapidly during the off periods of the chopping operation.

When the output of the gate 48 is low, the transistor 59 becomes nonconductive as above noted. The transistor 66 is thus turned on to rapidly dissipate any stored charge in the base area of the formerly conductive switching transistor 13. A Zener diode 68 and a serially connected, oppositely poled diode 69 prevents the base of the transistor 13 from becoming overly negative during the turn off operation.

Finally, with respect to FIG. 5, there is shown a typical plural (in this case three) phase load powering arrangement embodying the principles of the present invention. The correspondence between FIG. 5 (plural line phases) and the similar function portions of FIG. 2 (single line phase) is readily apparent, there simply being a phase lead network 30, zero crossing detector 32 and comparator 45 for each line phase, disjunctive logic 98 (e.g., an OR gate) being employed to combine the zero crossing-signaling pulses for all of the line phases as synchronized inputs to the relaxation oscillator 34 of FIG. 2. Correspondingly, logic structure such as that shown by the gates 48, 49 and 52, is employed in conjunction with the output of each of the comparators 45 in FIG. 5 to generate the control signals for the four diodes associated with each line phase, and each system load. The loads, in turn, may be connected to the multiple line phases in any manner well known to those skilled in the art, for example, the well known "Y" or Delta connections.

Power control is effected by simply controlling the relative dwell times of the switches 10 and 15 (of each phase) in the closed vis-a-vis open states during their active cycles, as above discussed. Such control may be effected by varying the frequency of the synchronized relaxation oscillator 34 (as by varying the resistance 39 serially connecting the timing capacitor 37 to a voltage source); by varying the setting of potentiometer 43 to adjust the threshold of the trigger circuit 40; or in any manner well known to those skilled in the art.

The above described arrangement has thus been shown by the above to provide a varying quantum of power to a load employing chopping operation such that the solid state control elements are operated either open or in or near saturation, thus dissipating a relatively small amount of power. This effects substantial power savings; extends power transistor life; and facilitates transistor mounting and system packaging. Apparatus is provided to suppress transients generated by the power chopping, and the apparatus may be utilized in either single phase or plural phase applications.

The above described arrangements are merely illustrative of the principles of the present invention. Numerous modifications and adaptations thereof will be readily apparent to those skilled in the art without departing from the spirit and scope of the present invention.

What is claimed is:

1. In combination in power controlling circuitry, a source of A.C. potential, a load, oppositely poled, shunt connected first and second directional controlled switches connected in parallel with said load, oppositely poled shunt connected third and fourth directional controlled switches serially connecting said load with said source of A.C. potential, and control circuit means, said control circuit means comprising pulsing means for alternately enabling each of said third and fourth directional controlled switches in a chopping mode of operation to control the power supplied to said load, said pulsing means comprising means for supplying a repetitive series of switchenabling pulses to each of said third and fourth directional controlled switches during each associated half-cycle of said A.C. potential.

2. A combination as in claim 2, wherein said control circuit means further comprises means for alternately enabling said first and second directional controlled switches responsive to the instantaneous polarity of the potential supplied by said A.C. potential source.

3. A combination as in claim 2, wherein said first and second switch controlling means includes means coupled to said source of A.C. potential for determining the polarity thereof.

4. A combination as in claim 2, wherein said control circuit means comprises means coupled to said source of A.C. potential for determining the polarity thereof, detection means coupled to said source of A.C. potential for providing an output identification upon each zero crossing thereof, relaxation oscillator means synchronized by the output of said zero crossing detecting means, threshold trigger means connected to said relaxation oscillator means, and logic means responsive to the outputs of said threshold trigger means and said line polarity determining means for providing output control signals for said first through fourth directional controlled switches.

5. A combination as in claim 4 wherein said logic means comprises plural coincidence logic gate means each supplied with the output of said threshold trigger circuit means and with an output from said line polarity determining means.

6. A combination as in claim 5, further comprising lead network means connected to said source of A.C. potential for providing a phase leading version thereof to said zero crossing detecting means.

7. A combination as in claim 1, further comprising plural additional sources of A.C. potential each supplying an A.C. potential of the same frequency as that supplied by said source of A.C. potential but differing in phase from the potential supplied by said source and differing in phase from each other, plural zero crossing detector means connected to each of said additional A.C. potential sources, and disjunctive logic means having plural inputs each connected to the output of a different one of said zero crossing detector means.

8. A combination as in claim 1, further comprising control circuit including means responsive to a first polarity obtaining from said A.C. potential source for closing said first and third controlled switches, opening said second controlled switch, and operating said fourth switch in a chopping mode;

and means responsive to the alternate A.C. potential polarity for closing said second and fourth switches, opening said first switch, and operating said third switch in a chopping mode.

9. A combination as in claim 8, wherein each of said first through fourth controlled switches comprises a transistor, and driver means isolated on a D.C. basis from any power main coupled to said transistor base-emitter junction and to said control circuit.

* * * * *